April 15, 1969    J. R. KIRK    3,438,083
DOOR CHECK AND HINGE FOR AUTOMATIC VEHICLES
Filed Aug. 22, 1966    Sheet 1 of 3
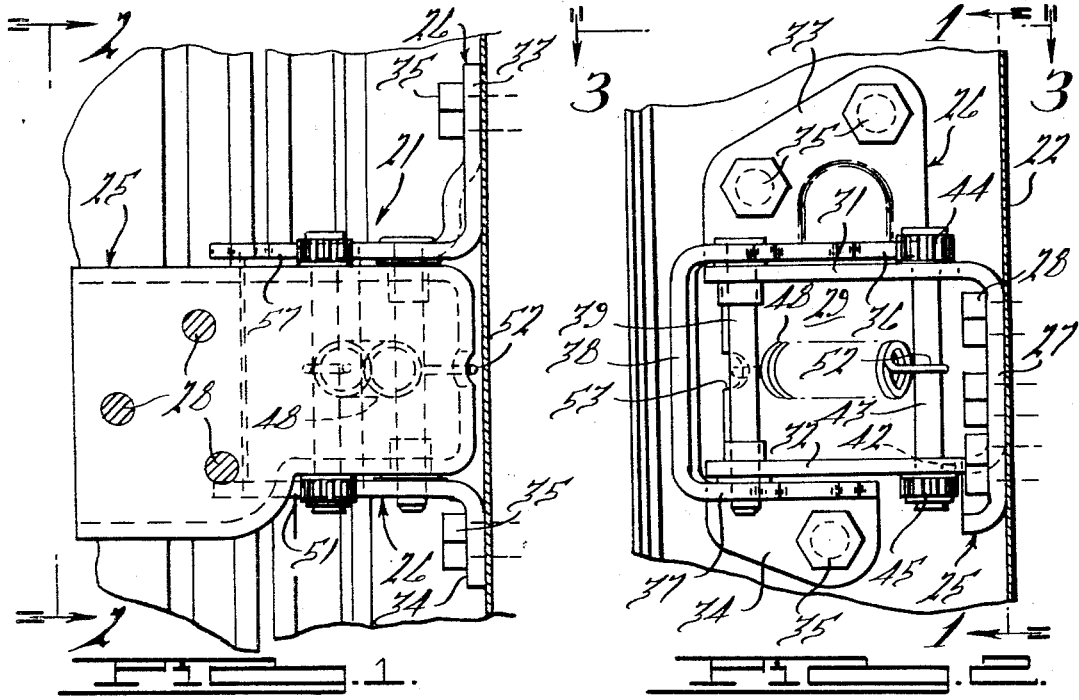
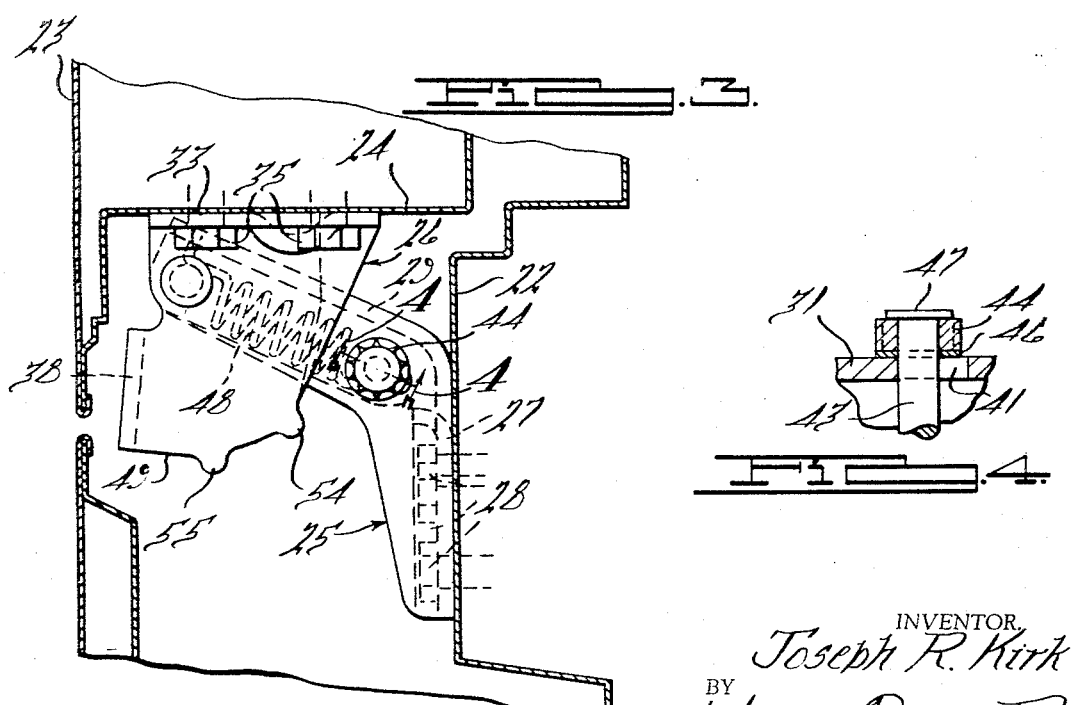
INVENTOR.
Joseph R. Kirk
BY
Harness, Dickey & Pierce
ATTORNEYS

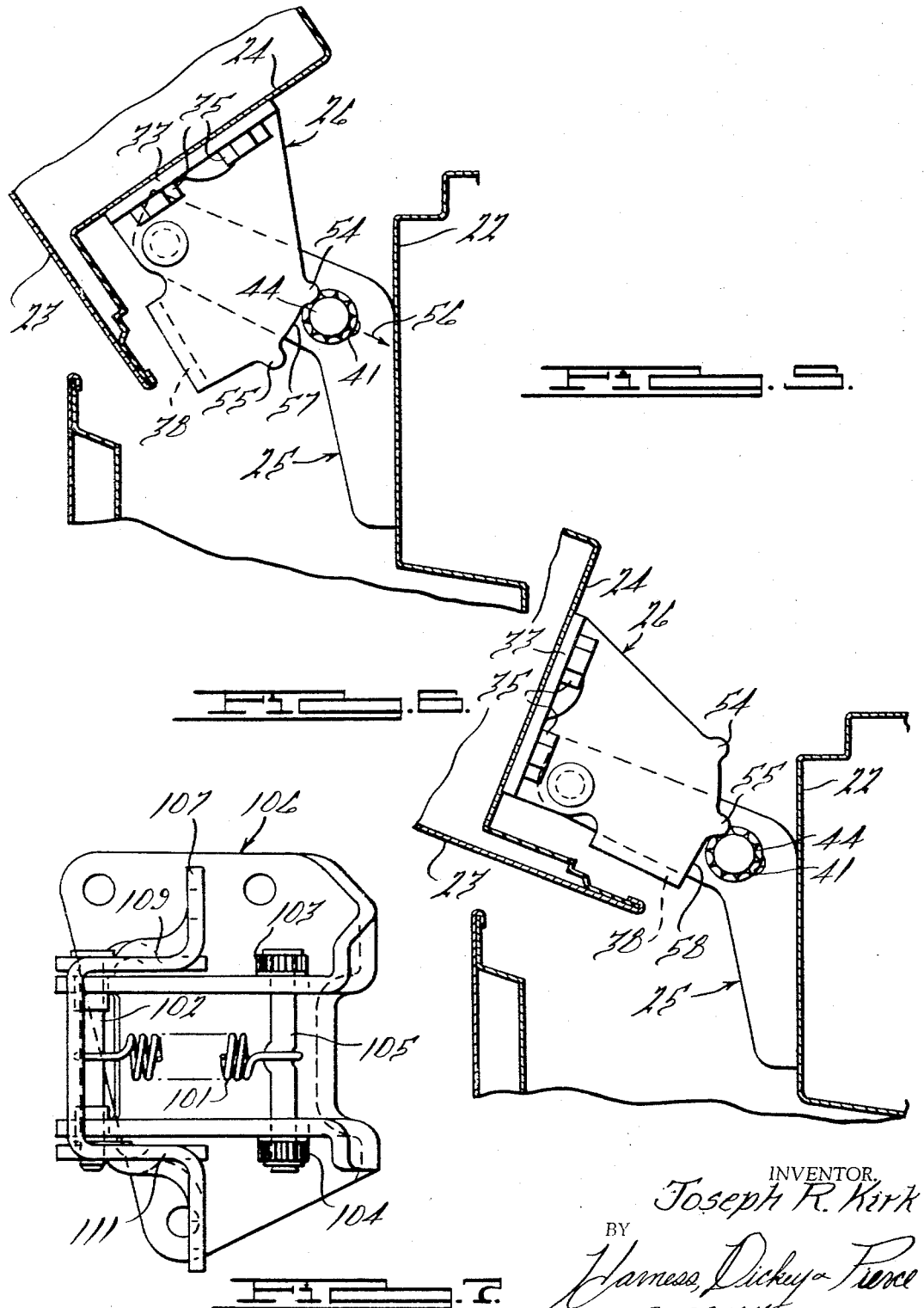

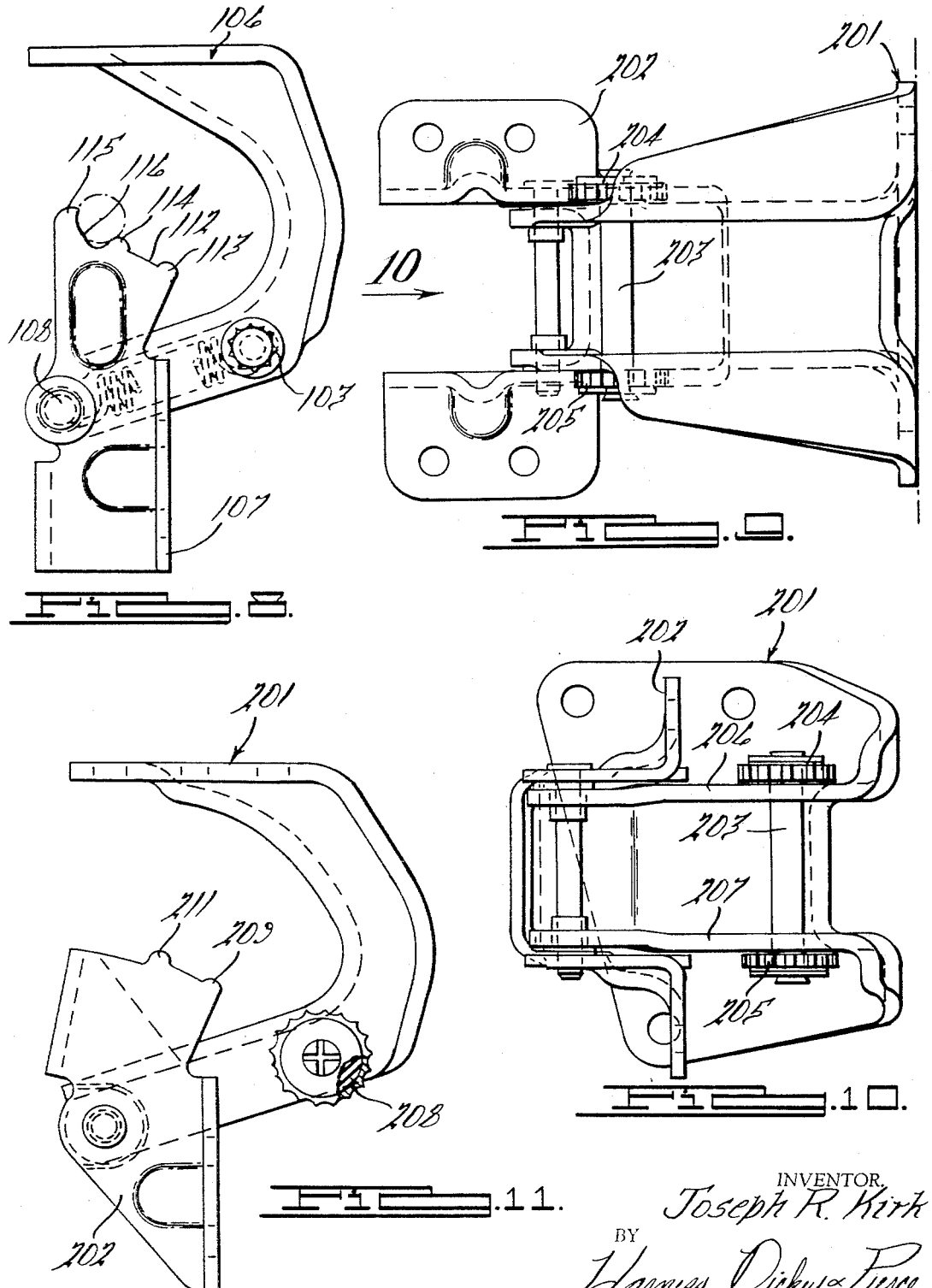

United States Patent Office
3,438,083
Patented Apr. 15, 1969

1

3,438,083
DOORCHECK AND HINGE FOR AUTOMATIC VEHICLES
Joseph R. Kirk, Jackson, Mich., assignor to Hancock Industries, Inc., Jackson, Mich., a corporation of Michigan
Filed Aug. 22, 1966, Ser. No. 574,058
Int. Cl. E05d 1/10; E05f 1/12
U.S. Cl. 16—139                                    9 Claims

ABSTRACT OF THE DISCLOSURE

A door hinge comprising two stamped members with overlapping flanges connected by a hinge pin. One member carries a scalloped detent roller spring-pressed toward protrusions on the flange of the other member. The protrusions engage the roller during opening and closing to create an over-center action which checks the door in the desired positions.

---

This invention relates to door hinges for automotive vehicles, and more particularly to the door check components on hinges of the stamped type.

The use of automotive door hinges made of stampings rather than of cast parts have recently become more widespread, due to factors such as cost savings and the limited availability of malleable steel. The present invention is concerned particularly with door check devices which may form part of such stamped hinges.

It is an object of the invention to provide a novel and improved door check and hinge construction for automotive vehicles which permits the hinge and check functions to be performed by a relatively small number of parts which are capable of manufacture at a greatly reduced cost, as compared with known types of door check devices used with automotive hinges.

It is another object to provide an improved door check and hinge construction of this type in which the checking load may be distributed in such a manner as to avoid cantilever forces and to minimize wear on the parts.

It is another object to provide an improved door check and hinge construction having these characteristics, which is adaptable to various shapes and types of automotive door hinges.

The manner of accomplishing the foregoing objects and other objects and features of this invention will become apparent from the following description of embodiments of the invention when read with reference to the accompanying drawings, in which:

FIGURE 1 is a side elevational view of a door hinge and check device constructed in accordance with the principles of this invention, the view being taken along the line 1—1 of FIGURE 2, with a portion of the door frame being sectioned, the view looking toward the outside of the vehicle;

FIGURE 2 is a rear elevational view of the hinge and check device taken along the line 2—2 of FIGURE 1 and looking toward the door frame from a section through the pillar;

FIGURE 3 is a top plan view of the hinge taken along the line 3—3 of FIGURE 2 and with the door in closed position;

FIGURE 4 is a detailed elevational view in cross section taken along the line 4—4 of FIGURE 3 and showing the elongated slots for guiding the detent roller supporting pin;

FIGURE 5 is a view similar to FIGURE 3 but showing the door in a partially opened position;

FIGURE 6 is a view similar to FIGURE 3 but with the door in fully opened position;

2

FIGURE 7 is a view similar to FIGURE 2 of a modified form of the invention in which the check spring is connected to the hinge pin rather than the pillar hinge member;

FIGURE 8 is a top plan view of the hinge construction shown in FIGURE 7;

FIGURE 9 is a side elevational view of still another embodiment of the invention in which the detent rollers are mounted on yieldable rubber supports which have a spring-like action during the checking operation;

FIGURE 10 is an end elevational view of the construction of FIGURE 9 taken in the direction of the arrow 10 thereof; and FIGURE 11 is a top plan view of the embodiment of FIGURES 9 and 10 with parts sectioned to show the nature of the rubber detent roller support.

Briefly, each of the illustrated embodiments of the invention comprises an automotive door hinge having two stamped parts, one of which is securable to the door pillar and the other to the door frame. Each of these hinge elements has a mounting section for attachment to its respective structural component (the pillar or the frame), and a pair of horizontally extending flanges, the flanges of the two members having overlapping portions connected by a hinge pin.

One of the hinge members carries at least one rotatable detent roller having a scalloped circumference. In each of the three illustrated embodiments of the invention, there are two detent rollers shown, one above the upper horizontal flange of said one hinge member and the other below the lower horizontal flange. In two of the three embodiments, the detent rollers are connected and supported by a pin which passes through aligned elongated slots in the two horizontal flanges, so that the rollers are capable of limited translatory as well as rotary movement. The edges of the horizontal flanges on the other hinge member which sweep past these detent rollers are of generally arcuate shape, and have a plurality of protrusions. A tension spring urges the detent roller supporting pin, and therefore the detent rollers themselves, toward these arcuately shaped edges of the other hinge member. The protrusions are engageable with the scalloped circumferences of the detent rollers when the door is opened or closed. This will cause rotation as well as translatory movement of the detent rollers, the translatory movement being against the action of the tension spring. An over-center action will thus be performed by the detent rollers, checking the door movement by yieldable engagement with the protrusions. These protrusions may be so spaced and arranged as to provide any desired number and location of intermediate and final checked positions for the door.

In the third embodiment of the invention, the detent roller supporting pin is mounted for pure rotation, but the detent rollers are connected to the pin by annular rubber grommets of relatively thick cross-sectional shape in a diametral plane. These rubber grommets will therefore yield to provide the same action as in the previously described embodiments.

Referring more particularly to FIGURES 1 to 6 of the drawings, the hinge is generally indicated at 21 and is shown as connecting the pillar 22 of an automotive vehicle and a door 23 thereof, the door having a frame 24. The hinge is composed of a pillar member generally indicated at 25 and a door member generally indicated at 26.

Each of these members preferably is of stamped construction, being fabricated of heavy gauge metal. Pillar member 25 has a mounting flange 27 securable to pillar 22 by bolts 28.

A wall 29 extends from one end of mounting section 27 in an angular fashion, as seen in FIGURE 3, this wall being in a vertical plane. Upper and lower horizontal flanges 31 and 32 respectively, are formed on member 25, these flanges extending horizontally from section 27 and wall 29.

Member 26 has upper and lower mounting sections 33 and 34 respectively, secured to door frame 24 by bolts 35. Upper and lower horizontal flanges 36 and 37 extend from the lower edge of section 33 and the upper edge of section 34 respectively. These flanges overlap horizontal flanges 31 and 32 of member 25, flange 36 being immediately above flange 31 and flange 37 being immediately below flange 32. Flanges 36 and 37 have a generally arcuate shape, as seen in FIGURE 3, and a vertical wall 38 connects flanges 36 and 37 on one side thereof. A hinge pin 39 connects the two hinge members, passing through the outer portions of flanges 31 and 32 and the inner portions of flanges 36 and 37.

A pair of elongated slots 41 and 42 are formed in flanges 31 and 32 respectively, these slots being generally parallel to wall 29 and located adjacent the juncture of wall 29 with mounting section 27. A detent roller supporting pin 43 extends through these aligned slots, and upper and lower detent rollers 44 and 45 respectively, are secured to the ends of this pin. Each detent roller is of scalloped shape around its circumference, and a washer 46 is disposed between each roller and its adjacent flange 31 or 32. The upper and lower ends of pin 43 are headed, as indicated at 47 in FIGURE 4, to retain the rollers in position.

A tension coil spring 48 is provided for urging pin 43 and therefore rollers 44 and 45 toward arcuate edges 49 and 51 respectively, of flanges 36 and 37. One end 52 of this spring is connected to the midpoint of rod 43 (FIGURE 2), and the other end is connected to a notch 53 on the outer edge of wall 29. The spring will normally hold the rollers in a detent position defined by the inner ends of slots 41 and 42.

A series of protrusions 54 and 55 are formed on each of arcuate edges 49 and 51, as seen in FIGURES 3, 5 and 6. These protrusions are of rounded shape with a radius of curvature corresponding to that of the scallops in rollers 44 and 45. Their location and relative spacing are such that they will successively engage rollers 44 and 45 when door 23 is swung open or closed. More particularly, protrusions 54 are so located that when door 23 is opened to an intermediate position (FIGURE 5) these protrusions will engage detent rollers 44 and 45. When door 23 is moved to a fully opened position (FIGURE 6) protrusions 55 will engage detent rollers 44 and 45.

In operation, the door will be checked in its partially opened position by the fact that protrusions 54 will force rollers 44 and 45, together with their supporting pin 43, in a direction of the arow 56 of FIGURE 5 (away from the hinge pin axis) as they engage rollers 44 and 45, this action momentarily tensioning spring 48 which will then return the detent rollers on the other side of the protrusions 54. The detent rollers will thus rest in the recessed portion 57 between protrusions 54 and 55, and the door will be yieldably held in its partially open position by virtue of the fact that attempted movement of the door to a closed position or to a fully opened position would encounter the resistance of spring 48.

Movement of the door to its fully opened position will cause protrusions 55 to pass detent rollers 44 and 45, and as they do so, wall 38 will engage the edges of flanges 31 and 32 to limit further opening of the door. Since protrusions 55 have passed the detent rollers, they will be urged into the recess 58 between protrusions 55 and wall 38 so that the door will be yieldably held in its fully opened position.

The location and relative spacing as well as the sizes of protrusions 54 and 55 could of course be varied to achieve any given set of conditions as far as door checking and hold-open positions are concerned. The arrangement could be such as to attain a free floating partially open position or a more restrained intermediate position.

It should be observed that the shape and position of slots 41 and 42 could be varied to get different effects.

FIGURE 7 shows another embodiment of the invention which is basically the same as that of FIGURES 1 to 6 except that the spring, indicated at 101 in FIGURES 7 and 8 is held by hinge pin 102 rather than by the notched portion of wall 29 mentioned earlier. This embodiment also shows the detent rollers 103 and 104, together with their supporting pin 105, as being supported by the door hinge member 106 instead of the pillar member 107. That is to say, pillar hinge member 107 is connected to door hinge member 106 by a hinge pin 108 and has upper and lower flanges 109 and 111 respectively, which have arcuate edges 112. Member 106 on the other hand carries the detent rollers, their supporting pin 105 being disposed in elongated slots as in the previous embodiment. In FIGURE 8, the hinge is shown with the door in its closed position (although the door and pillar are not visible in these figures). Counterclockwise movement of door frame member 106 in FIGURE 8 would result in scalloped detent rollers 103 and 104 first engaging protrusions 113 on edges 112, and upon passing these protrusions, the door would be checked in its intermediate position. Further opening of the door would cause the detent rollers to pass protrusions 114 in FIGURE 8, and they would then engage stop projections 115, being held in recesses 116. The hinge thus performs stop and check functions as in the previous embodiment.

FIGURES 9, 10 and 11 show still another embodiment of the invention which has hinge members 201 and 202 shaped similarly to members 106 and 107 of the previous embodiment. In this case, however, the supporting pin 203 for detent rollers 204 and 205 is mounted in circular holes rather than elongated slots in horizontal flanges 206 and 207 of member 201. The detent rollers are mounted thereon by means of thick annular rubber grommets 208, seen particularly in FIGURE 11. The detent rollers are of relatively thin annular shape and have the scalloped edges described above. However, when protrusions 209 or 211 of pillar hinge member 202 are engaged by detent rollers 204 and 205, they will cause the rubber grommets 208 to become momentarily compressed in their thick radial direction, so that the scalloped rollers may, by translatory movement away from their detent position, pass over the protrusions and into the next recesses on the arcuate edges of hinge member 202. The door will thus be checked in its partially or fully opened position because of the spring-like action of grommets 208 which will return the detent rollers to their detent position.

It should be noted that the protrusions on hinge members in any of the above described embodiments will tend to engage different scalloped surfaces during continued use of the door hinge so that wear on the parts will be correspondingly reduced. It should also be observed that the scallops have an overcenter or toggle lever action as they pass over the protrusions.

While it will be apparent that the embodiments of the invention herein disclosed are well calculated to fulfill the objects of the invention, it will be appreciated that the invention is susceptible to modification, variation and change.

What is claimed is:

1. In a door hinge and check construction for automotive vehicles, a hinge comprising a pillar member and a door member, said pillar member having a mounting section securable to the door pillar, a wall extending from said mounting section, and upper and lower flanges extending from and all along said mounting section and wall, said door member comprising a mounting section securable to the door frame and a pair of upper and lower flanges extending from said mounting section and overlapping the flanges of said pillar member, apertured portions in said flanges, all of said apertured portions being entirely surrounded by the material of said flanges, a hinge pin extending through the apertured portions of said flanges and pivotally connecting said hinge members, a detent roller having scallops mounted on the flanges of one of said members so as to be capable of rotation on a vertical axis and also capable of limited translatory movement from a detent position in a direction away from said hinge pin, resilient means for urging said detent roller toward its detent position, one of said flanges on the other hinge member being in the same plane as said detent roller and having an arcuate edge facing the detent roller, and at least one protrusion on said arcuate edge having approximately the same radius of curvature as said scallops, the relative positions of said protrusion and detent roller being such that when the door is opened said protrusion will enter one of said scallops and momentarily force said detent roller away from its detent position against said resilient means, whereby said resilient means will return said detent roller to its detent position after the protrusion has passed the detent roller, thus checking the door in a predetermined position.

2. The combination according to claim 1, further provided with a second detent roller coaxial with said first detent roller and of similar shape, said detent rollers being adjacent and immediately outside the flanges of the hinge member on which they are mounted, the other flange on said other hinge member being in the same plane as said second detent roller and also having an arcuate edge with a protrusion engageable with said second detent roller.

3. The combination according to claim 2, further provided with a detent roller supporting pin on which said detent rollers are mounted, and a pair of elongated slots in the flanges of said one hinge member for guiding said translatory movement of the detent rollers, said detent roller supporting pin extending through said slots.

4. The combination according to claim 3, said resilient means comprising a tension coil spring having one end connected to said detent roller supporting pin, the other end of said spring being connected to said other hinge member.

5. The combination according to claim 4, said other end of the spring being directly secured to said hinge pin.

6. The combination according to claim 1, said one hinge member being the pillar hinge member and said other hinge member being the door hinge member, said door hinge member being further provided with a wall connecting the outer ends of said flanges, the shape of said wall being such that it will engage the outer edges of the flanges of said pillar hinge member when the door is swung to its fully opened position to limit such opening movement, and a second protrusion on said arcuate flange edge angularly spaced from said first protrusion and so located that said door will be checked by said detent roller in said fully open position.

7. The combination according to claim 2, said one hinge member being the pillar hinge member and said other hinge member being the door hinge member, said door hinge member being further provided with a wall connecting the outer ends of said flanges, the shape of said wall being such that it will engage the outer edges of the flanges of said pillar hinge member when the door is swung to its fully opened position to limit such opening movement, and a second protrusion on each of said arcuate flange edges angularly spaced from said first protrusion and so located that said door will be checked by said detent roller in said fully open position.

8. The combination according to claim 1, said limited translatory movement of the detent roller being provided by an annular rubber grommet of relatively thick cross-sectional shape, in a radial direction, said detent roller surrounding said rubber grommet and the rubber grommet surrounding a pin carried by at least one of said flanges on said one hinge member.

9. The combination according to claim 8, said last-mentioned pin extending through both of the flanges on said one hinge member, a second detent roller carried by said one hinge member, the two detent rollers being immediately outside the flanges of said one hinge member, and a second rubber grommet for yieldingly supporting said second detent roller in the same manner as said first detent roller, the other flange on said other hinge member being in the same plane as said second detent roller and also having an arcuate edge with a protrusion engageable with said second detent roller.

References Cited

UNITED STATES PATENTS 3,065,479  11/1962  Faber _____ 16—146

FOREIGN PATENTS 97,908  2/1964  Denmark.

BOBBY R. GAY, *Primary Examiner.*

DORIS L. TROUTMAN, *Assistant Examiner.*

U.S. Cl. X.R.

16—145, 180

U.S. DEPARTMENT OF COMMERCE

PATENT OFFICE

Washington, D.C. 20231

UNITED STATES PATENT OFFICE
CERTIFICATE OF CORRECTION

Patent No. 3,438,083                                               April 15, 19

Joseph R. Kirk

It is certified that error appears in the above identified patent and that said Letters Patent are hereby corrected as shown below:

In the heading to the drawings and printed specification, in the title, "AUTOMATIC", each occurrence, should read -- AUTOMOTIVE --.  Column 3, line 52, "arow" should read -- arrow --.  Column 6, lind 30, "yieldingly" should read -- yieldably --; line 39, "3,065,479" should read -- 3,065,497 --.

Signed and sealed this 14th day of April 1970.

(SEAL)
Attest:

Edward M. Fletcher, Jr.

Attesting Officer

WILLIAM E. SCHUYLER, JF

Commissioner of Patent